(12) United States Patent
Miyauchi (10) Patent No.: US 6,529,198 B1
(45) Date of Patent: Mar. 4, 2003

(54) PARALLEL RENDERING DEVICE

(75) Inventor: Yoshihito Miyauchi, Ehime (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/525,474

(22) Filed: Mar. 15, 2000

(30) Foreign Application Priority Data

Mar. 16, 1999 (JP) ............................................. 11-069812

(51) Int. Cl.$^7$ ............................. G06F 15/80; G09G 5/00
(52) U.S. Cl. ........................ 345/505; 345/531; 345/781; 345/806
(58) Field of Search ................................. 345/505, 520, 345/531, 545, 619, 629, 764, 787, 806

(56) References Cited

U.S. PATENT DOCUMENTS

| | | | |
|---|---|---|---|
| 5,388,206 A | | 2/1995 | Poulton et al. |
| 5,434,968 A | * | 7/1995 | Kunii et al. ................. 345/505 |
| 5,440,682 A | * | 8/1995 | Deering ....................... 345/503 |
| 5,471,579 A | * | 11/1995 | Kimura et al. .............. 345/505 |
| 5,572,657 A | * | 11/1996 | Pinedo et al. ............... 345/506 |
| 5,757,385 A | * | 5/1998 | Narayanaswami et al. .. 345/505 |
| 5,794,016 A | * | 8/1998 | Kelleher ...................... 345/505 |
| 6,329,996 B1 | * | 12/2001 | Bowen et al. ............... 345/503 |

FOREIGN PATENT DOCUMENTS

| | | |
|---|---|---|
| EP | WO 97/21192 | 6/1997 |
| JP | 64-23677 | 1/1989 |
| JP | 2-150973 | 6/1990 |
| JP | 7-182536 | 7/1995 |

OTHER PUBLICATIONS

K. Akeley and T. Jermoluk. High–Performance Polygon Rendering. Computer Graphics, vol. 22, No. 4, pp. 239–246, 1988.*

M. Cox and P. Hanrahan. Pixel Merging for Object–Parallel Rendering: a Distributed Snooping Algorithm. Proceedings of the 1993 Symposium on Parallel Rendering. pp 49–56, 1993.*

T. Mitra and T. Chiueh. Dynamic 3D Graphics Workload Characterization and the Architectural Implications. Proceedings of the 32nd Annual ACM/IEEE International Symposium on Microarchitecture. pp 62–71, 1999.*

C. Mueller. Hierarchical Graphics Database in Sort–First. Proceedings of the IEEE Symposium on Parallel Rendering. pp 49–57 1997.*

* cited by examiner

Primary Examiner—Ulka J. Chauhan
(74) Attorney, Agent, or Firm—McGinn & Gibb, PLLC (57) ABSTRACT

Rendering command/data generator 1 distributes rendering commands and data to each of rendering devices 3-1–3-n with rendering commands and data for one screen as a unit. Each of rendering devices 3-1–3-n carries out generating of display data and storing of the display data in a rendering memory incorporated in each rendering device in accordance with the rendering commands and data. The content of the rendering memories is read out by a read signal that: is supplied from display control unit 2 and synchronized with the scan of display 7. Window number buffer 4 issues the window number of the window in which a pixel currently to be displayed is included. Window number/rendering device management table 6 issues the device number of the rendering device as a selection signal. Display switch 5 selects the rendering device of the device number indicated by the selection signal to connect the rendering device to the display. In this way, the most recent display data of the window of the above-described window number is supplied to the display.

10 Claims, 6 Drawing Sheets

(A)  Image of Window Number Buffer for New Window Creation (B)  Image of Window Number Buffer for Movement of Window

PARALLEL RENDERING DEVICE

BACKGROUND OF THE INVENTION

1. Field of the Invention

The present invention relates to a technology for accelerating screen display such as computer graphics in which repeated updating of the screen is required. More specifically, the present invention relates to a parallel rendering device for accelerating processing speed by distributing the screen rendering process to a plurality of rendering devices on a screen-to-screen base.

2. Description of the Related Art

In recent years, the trend in the field of applications of computer graphics has been toward such fields as three-dimensional graphics animations in which the amount of information of rendering data is constantly expanding. Along with this trend is the increasing demand for accelerated display.

Examples of the prior art for dealing with this demand for acceleration involve the use of pipeline processing (for example, Japanese Patent Laid-open No. 150973/90). This type of the art is referred to hereinbelow as the first example of the prior art.

Another example of the known prior art for dealing with this demand for acceleration described above involves apportioning of the rendering processing among a plurality of rendering devices based on rendering commands. This type of solution is described in, for example, Japanese Patent Laid-open No. 150973/90 and Japanese Patent Laid-open No. 182536/95. This type of the prior art is referred to as the second example of the prior art.

Of the above-described prior art, the first example of the prior art may be held back by the slowest processing unit and thus may fail to take full advantage of the performance of other, faster processing units. In such a case, the problem arises that processing speed cannot be adequately accelerated.

In the second example of the prior art, on the other hand, it must be decided for each rendering command whether or not rendering should be executed in accordance with the rendering command. This decision is necessary to eliminate display abnormalities that may occur when processing of a certain rendering command is outstripped by performance of another rendering command. The problem therefore arises that processing is slowed by the time required for this decision.

It is an object of the present invention to provide a parallel rendering device that can solve the above-described problems of the first and second examples of the prior art and allow an acceleration of the rendering process.

SUMMARY OF THE INVENTION

To achieve the above-described object, the first parallel rendering device of the present invention is provided with:

a plurality of rendering devices for generating display data in accordance with received rendering commands and data and storing the display data, each of the rendering device issuing a window number of the window that the rendering device is charged to render, upon completion of the generating and storing the display data;

a rendering command/data generator for generating a rendering command and data and sequentially distributing the rendering command and data to each of the rendering devices with the rendering command and data for displaying one screen of a window as a unit;

display switch means for connecting one of the rendering devices to a display to supply display data generated by the one of the rendering devices in response to a selection signal;

a window number buffer for storing information indicating the position of the visible portion of each window to be displayed on the display;

a window number/rendering device management table for registering the window number in combination with a corresponding rendering device number, said corresponding rendering device number being the device number of the rendering device that issued the window number of concern, the window number/rendering device management table, while receiving the information from the window number buffer, issuing, as the selection signal, rendering device number registered in combination with the window number of the window that has the visible portion indicated by the information; and means for controlling display, the means for controlling display controlling reading of the information stored in the window number buffer as well as reading of the display data from each of the plurality of rendering devices.

The window number buffer has sections each corresponding to the visible portion of each window, each of the sections is subdivided into areas corresponding to pixels in the visible portion of the window in the screen of the display.

Each of the areas stores a window number of the window that includes the pixel corresponding to the area of concern so that the position of the visible portions of all windows are mapped on the window number buffer to represent the above-described information.

The rendering command/data generator can allocate the window numbers to the window number buffer depending on a change in a state of display of a window.

The rendering device can have a function of issuing a permission signal by which the rendering device of concern permits a rendering device that is to perform rendering next to the rendering device of concern to start rendering.

The permission signal being issued after the rendering device of concern issues the window number.

The display can be a raster scan display, and, in this case, the means for controlling display reads the window number from the window number buffer to supply the window number to the window number/rendering device management table and also the means for controlling display reads the display data from the rendering device connected to the raster scan display by the display switch means, both in synchronization with vertical and horizontal synchronization signals.

The second parallel rendering device of the present invention comprises a plurality of boards, a rendering command/data generator for generating a rendering command and data and sequentially distributing the rendering command and data to each of the boards with the rendering command and data for displaying one screen of a window as a unit, and means for controlling display.

Each of the boards comprises:

a rendering device for generating display data in accordance with received rendering commands and data and storing the display data, each of the rendering device issuing a window number of the window that the rendering device is charged to render, upon completion of the generating and storing the display data;

window number buffer having sections each corresponding to visible portions of windows to be rendered by the rendering device of the board concerned as well as rendering devices of other boards, each of the sections being subdivided into areas that correspond to pixels included in the visible portion of the window in the screen of the display, wherein each of the areas stores a window number of the window that includes a pixel corresponding to the area of concern so that the positions of the visible portions of the windows to be rendered by the parallel rendering device are mapped on the window number buffer of each board;

a window number/rendering device management table for registering the window numbers in combination with corresponding rendering device numbers, the corresponding rendering device numbers being the device numbers of the rendering devices that issued the window number, the window number/rendering device management table, while receiving the window number from the window number buffer, issuing, as a selection signal, rendering device number registered in combination with the received window number:

display switch means for transferring, to a display, display data supplied from a rendering device of its own board as well as for passing the display data provided by rendering devices of the other boards, the display switch means being serially connected with display switch means of other boards by bus and selecting the transfer or the passage of the display data in response to the selection signal; and means for controlling display to control reading of the window number stored in said window number buffer as well as reading of the display data from each of the rendering devices in the plurality of boards, wherein the means for controlling display reads display data to supply to a pixel of a window and reads the window number from an area of the window number buffer corresponding to the pixel.

The content of the window number/rendering device management table can be updated each time when the rendering device charged with rendering of a window is changed.

The rendering command/data generator can have a plurality of render programs and a window management program. The render programs are each charged with rendering of differing windows and issue rendering commands and data necessary for rendering windows. The window management program distributes the rendering commands and data sequentially issued by the render programs to each of rendering devices screen by screen, and each time when an issue of the rendering command and data to a rendering device is completed, issues the window number of the window to be rendered, to the rendering device of concern. The window management program issues window numbers to be stored in the window number buffer, and the means for controlling display controls writing of the window numbers to the window number buffer to allocate the window numbers in the window number buffer.

Each of the rendering devices can include two rendering memories and write display data that were generated based on the rendering commands and data to one of the rendering memories while providing an output of the content of the other rendering memory.

Each of the rendering devices is provided with a display list data unit for storing display list data that indicate a plurality of polygon shapes. Each of the rendering devices generates display data based on rendering commands and data issued by said rendering command/data generator and the contents of the display list data unit.

The above and other objects, features, and advantages of the present invention will become apparent from the following description referring to the accompanying drawings which illustrate examples of preferred embodiments of the present invention.

BRIEF DESCRIPTION OF THE DRAWINGS

FIGS. 2($a$) and 2($b$) shows the content of the window number buffer as an image.

DETAILED DESCRIPTION OF THE PREFERRED EMBODIMENTS

The embodiments of the present invention are next explained in detail with reference to the accompanying figures.

Figure 1:
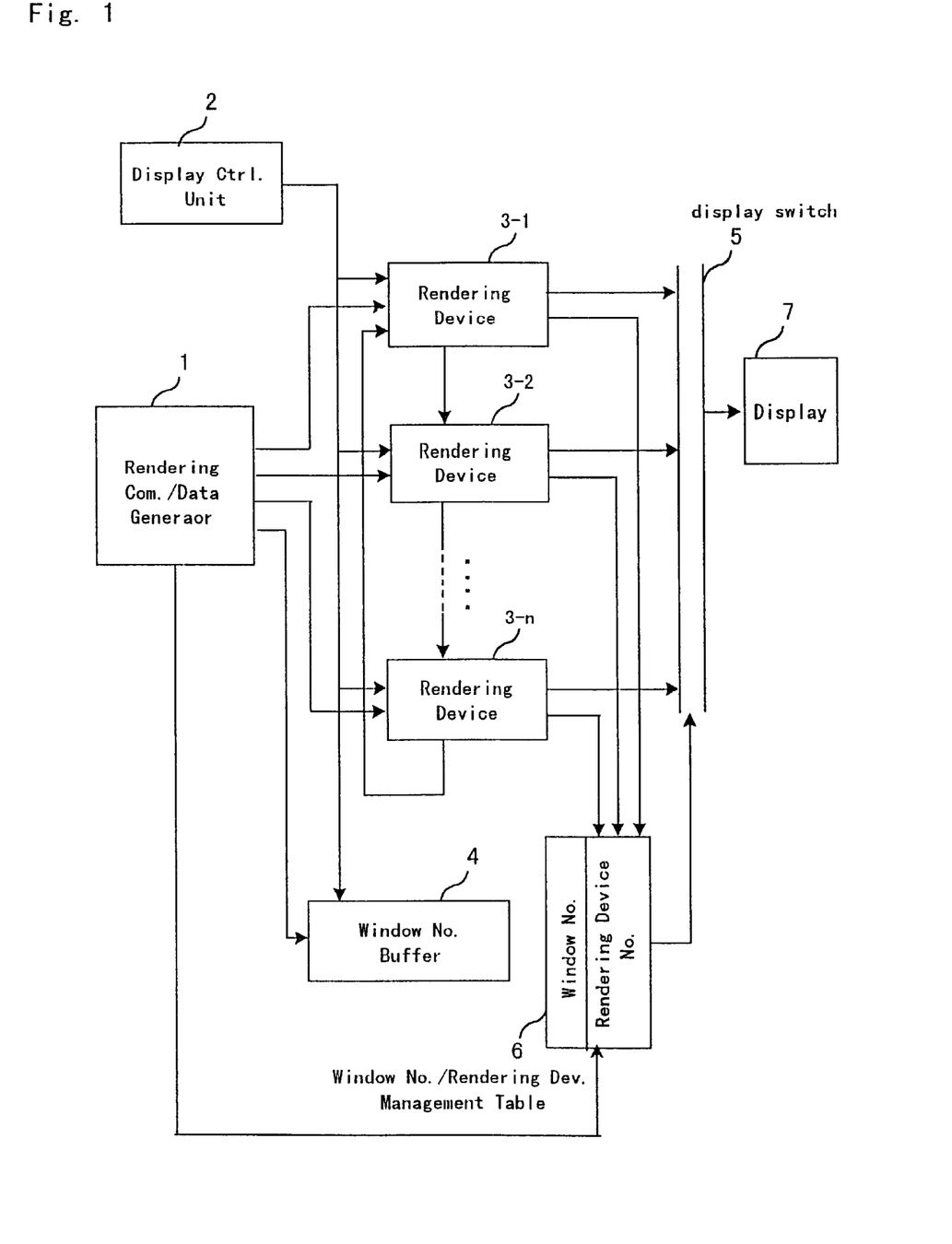
FIG. 1 is a block diagram of the first embodiment of the present invention.

FIG. 1 is a block diagram showing the first embodiment of the present invention. The parallel rendering device of this embodiment is provided with: rendering command/data generator 1, first to $n^{th}$ rendering devices 3-1–3-n, window number buffer 4, display control unit 2, window number/rendering device management table 6, display switch 5, and display 7.

Rendering command/data generator 1 generates rendering commands and data such as coordinates necessary to rendering.

First to $n^{th}$ rendering devices 3-1–3-n generate display data by carrying out rendering processing in accordance with the rendering commands and data received from rendering command/data generator 1, and save the generated display data in rendering memories (not shown) with a capacity for a one-screen data provided in each rendering device.

Window number buffer 4 saves window number information for each pixel on the display screen of display 7, wherein the window number information indicates, for each pixel, which numbered window that pixel displays.

Display control unit 2 controls first to $n^{th}$ rendering devices 3-1–3-n and window number buffer 4 such that supply of display data from first to $n^{th}$ rendering devices 3-1–3-n and supply of window numbers from window number buffer 4 synchronize with the scan of the display screen of display 7 (i.e., such that the display data and window number corresponding to the currently displayed pixel are currently supplied from rendering devices 3-1–3-n and window number buffer 4, respectively).

A window number and the device number of the rendering device to be used when the window of that window number is displayed are registered in combination in window number/rendering device management table 6, and when a window number is supplied from window number buffer 4, the management table 6 provides, as an output, the device number registered in combination with the supplied window number.

Display switch 5 selects, of the display data provided from the first to $n^{th}$ rendering devices 3-1–3-n, the display data provided from the rendering device designated by the output of window number/rendering device management table 6 (device number), and supplies the selected data to display 7.

Display 7 displays the display data supplied from display switch 5.

The configuration and functions of each of the constituent elements are next explained in detail.

Rendering command/data generator 1 has the function of initializing the computer resources, for example, window number buffer 4 and window number/rendering device management table 6 as well as the function of supplying rendering commands and data relating to windows to be rendered. When supplying rendering commands or data, rendering command/data generator 1 sequentially distributes rendering commands and data to first to $n^{th}$ rendering devices 3-1–3-n, with the rendering commands and data for one screen of a window to be rendered as a unit.

This distribution, for example, may involve providing the rendering commands and data for the first screen to first rendering device 3-1, then supplying the rendering commands and data for the second screen to second rendering device 3-2, and subsequently changing the rendering device to be supplied with rendering commands and data. Upon completion of supplying the $n^{th}$ rendering command and data (the rendering command and data for the $n^{th}$ screen) to $n^{th}$ rendering device 3-n, the $[n+1]^{th}$ rendering command and data are again supplied to first rendering device 3-1. Distribution is thus performed through circulation of the rendering device to which the rendering command and data are destined.

Rendering command/data generator 1 further has the function of supplying the window number of a window to each of rendering device 3-i ($1 \leq i \leq n$). Rendering command/data generator 1 performs this function when having finished supply of rendering command and data for the window to rendering device 3-i of concern. Rendering command/data generator 1 also has the function of rewriting the content of window number buffer 4. Rendering command/data generator 1 performs the latter function when changing the display state of a window such as displaying a new window to the display screen of display 7, altering the position of a window, or closing a window.

Window number buffer 4 has an area corresponding to the pixels on the display screen of display 7, and the window number of the window to be displayed by the pixels is set in the corresponding area of the buffer 4. Rendering command/data generator 1 performs the setting of this window number. When a new window is created, the window number of that new window is set in the corresponding areas of window number buffer 4. When a window is to be moved, the window number of that moving window is set in that area of the buffer 4 that corresponds to the pixels in the display areas of the window after it is moved. The window number of a window portion that becomes visible by this movement of the window is set in that areas of the buffer 4 which correspond to the pixels in the display area of the window that becomes visible.

FIGS. 2(A) and (B) present images for explaining the content of window number buffer 4 when a new window is created and when a window is moved, respectively.

Figure 2:
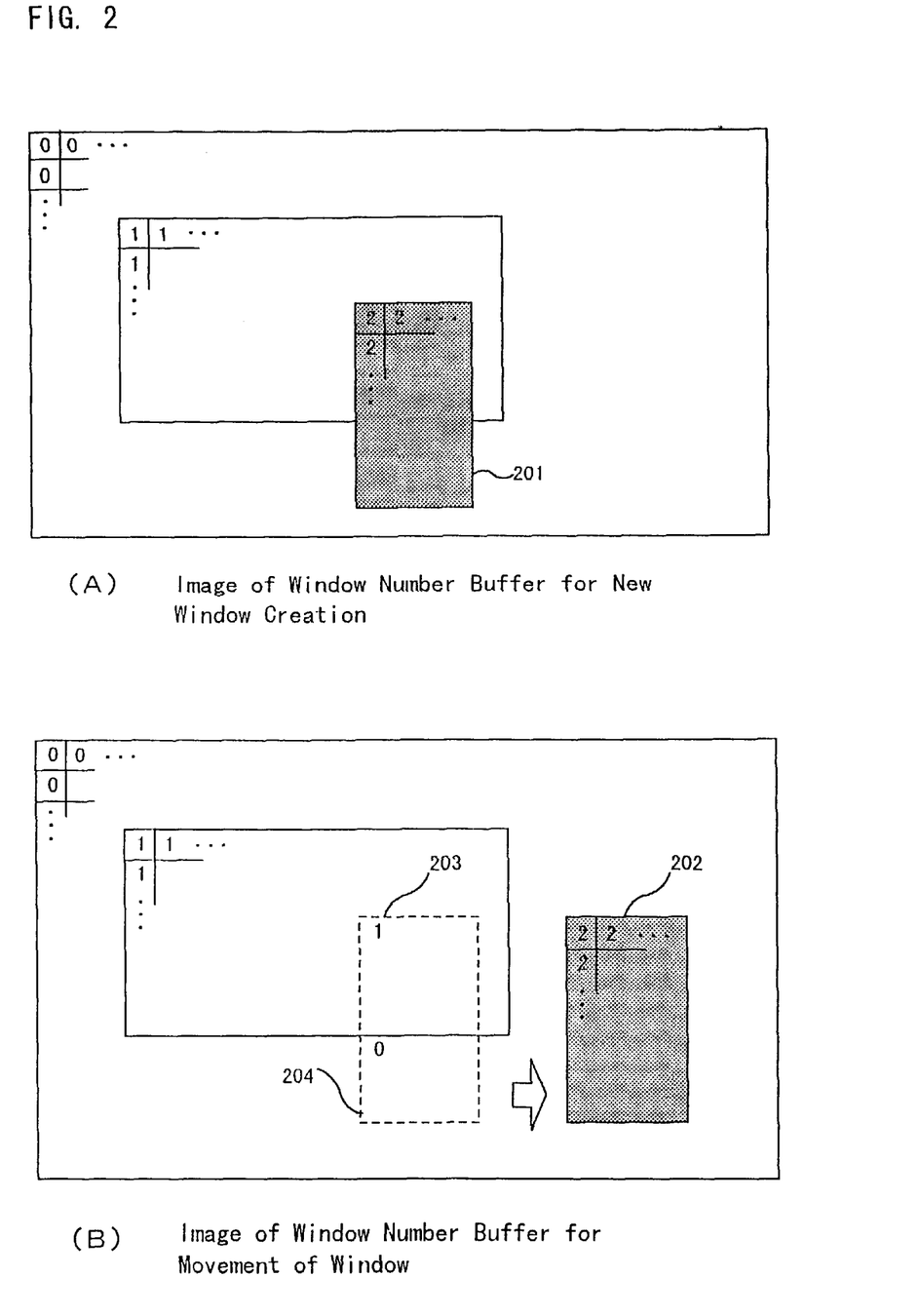

In FIG. 2, the sections of window number buffer 4 correspond to the windows of window number 0,1 and 2. Each of the sections is subdivided into small areas each corresponding to pixels of the window. The window number is written in each of the small areas. When a new window is created, a unique window number (in this case "2") is written in that areas in window number buffer 4 that correspond to the pixels in the newly created window area as shown by reference number 201 in FIG. 2(A). When a window is moved, on the other hand, as shown by reference number 202 in FIG. 2(B), a window number (in this case "2") is written in those areas of window number buffer 4 that correspond to the pixels in the window after movement. The window numbers of those areas in window number buffer 4 that were originally written as 2 are revised after the movement of the window. The window numbers for those portions of the windows that were under the moving window before the movement of the window (in this example, the moving window overlaps other windows)and become visible after the movement (in this case, "1" and "0") are written in those areas in the sections of window number buffer 4 that correspond to the pixels of the window before the movement, as indicated by reference numbers 203 and 204.

Under the control of display control unit 2, window number buffer 4 supplies window numbers to window number/rendering device management table 6 on a pixel-to-pixel basis in synchronization with the display timing of display 7. In the case that display 7 is a raster scan display, for example, window number buffer 4 supplies window numbers in synchronization with the output timing of the display data, to specify which window is to be displayed by the display data. In this way, the display data are supplied successively to pixels of the desired window synchronized with vertical synchronizing signals and horizontal synchronizing signals. As one example for realizing this process, display control unit 2, based on the vertical and horizontal synchronizing signals of display 7, provides, as a read-out address, an address of the area in window number buffer 4 that corresponds to the pixel to be currently displayed on display 7.

Rendering devices 3-1–3-n each have the same function of generating display data based on rendering commands and data received from rendering command/data generator 1 and also of rendering the display data to a rendering memory incorporated in each device. Each rendering devices 3-1–3-n then supplies the content of the rendering memory to display switch 5 in response to the control of display control unit 2. Here, "render display data to the rendering memory" means to store display data to the rendering memory. The rendering memory has storage areas sufficient to store display data for all pixels making up the display screen. Since display data controls the brightness or color of a pixel and since a storage area in the rendering memory corresponds to a pixel of the display screen, a sequence of the display data stored in the rendering memory is equivalent to a picture rendered on a display.

According to control of display control unit 2, each of rendering devices 3-1–3-n issues display data in synchronization with the display timing of display 7. In a case in which display 7 is a raster scan display, the display data are supplied from rendering devices 3-1–3-n to pixels of the display in synchronization with the vertical synchronizing signals and horizontal synchronizing signals. To realize this process, display control unit 2 issues, as read-out addresses, the addresses of the rendering memory areas that correspond to pixels to be currently displayed on display 7. The pixel subject to display is designated by the vertical and horizontal synchronizing signals of display 7.

In addition, rendering devices 3-1–3-n each have buffers of sufficiently large storage capacity to receive the rendering commands and data from rendering command/data generator 1 without waiting even in a case in which the render process time becomes lengthy. Further, each of rendering devices 3-1–3-n has the functions of transmitting the window number and issuing a permission signal.

By the function of transmitting the window number, each of the rendering devices transfers the window number that has been received from rendering command/data generator 1 to window number/rendering device management table 6 after the processing of rendering commands and data for one window is completed.

By the function of issuing a permission signal, the rendering device of concern, after executing the function of transmitting the window number, issues a permission signal to a rendering device that is to perform rendering next to the rendering device of concern. In this case, if a permission signal is not issued from the preceding rendering device that is to perform rendering processing preceding the rendering device of concern, then the rendering device of concern delays performing the function of transmitting the window number and issuing a permission signal until the permission signal is issued.

The reason for waiting for the issuing of a permission signal and then transmitting the window number to management table 6 is to prevent the sequence of completions of rendering processes performed by the preceding rendering device and the rendering device of concern from being reversed. Here, the preceding rendering device refers to a rendering device that performs rendering of a screen the display order of which precedes the screen rendered by the rendering device of concern. If the rendering device transmits a window number immediately after completing the rendering processing without waiting for the permission signal, then the sequence of completions of rendering processes performed by two rendering devices can be reversed, and overtaking of a screen may take place.

As described hereinabove, the window number and the device number of the rendering device to be employed for rendering the window of the window number are registered in combination in window number/rendering device management table 6. A device number registered in combination with a window number is delivered to display switch 5 when the window number is supplied from window number buffer 4. The content of window number/rendering device management table 6 is updated based on both the window numbers that are transmitted from rendering devices 3-1–3-n and the device numbers of the rendering devices that have sent these window numbers. In this updating process, the device number in combination with each of the window numbers is updated.

In order to provide selection information for display switch 5, the window number is supplied from window number buffer 4 to window number/rendering device management table 6 on a pixel-to-pixel basis. In response to reception of the window number, the management table 6 provides, as an output, a device number registered therein that is in combination with the received window number. Display switch 5 receives the device number at the timing on a pixel-to-pixel basis. This device number serves as information regarding which rendering device supplies display data to be displayed. Based on this information, display switch 5 selects one of rendering devices 3-1–3-n and delivers the display data to display 7.

Display 7 receives the display data from display switch 5, carries out conversion such as digital/analog conversion as necessary, and displays a graphics screen on, for example, a CRT.

Figure 3:
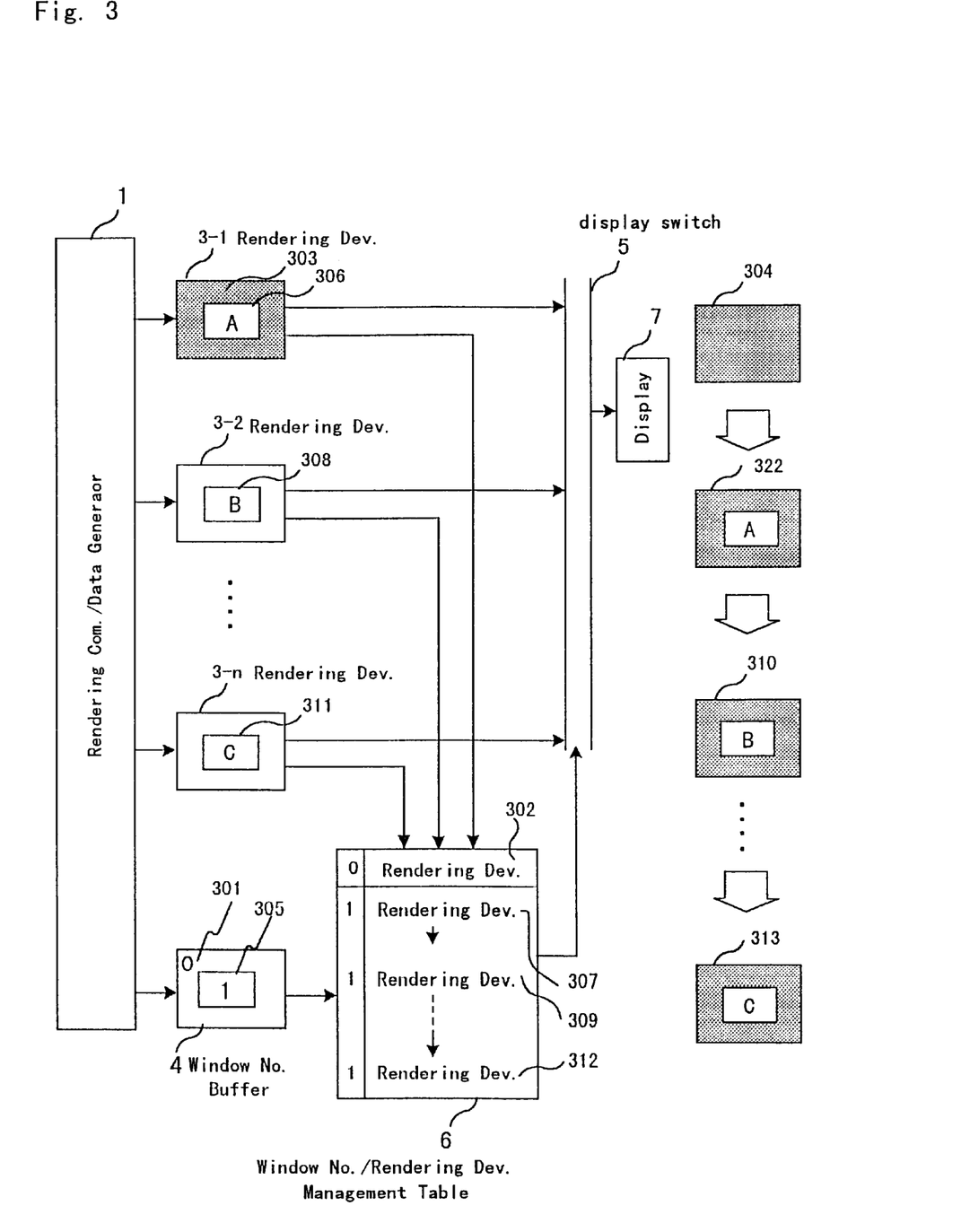
FIG. 3 is an explanatory view of the operation of the embodiment of FIG. 1.
Figure 4:
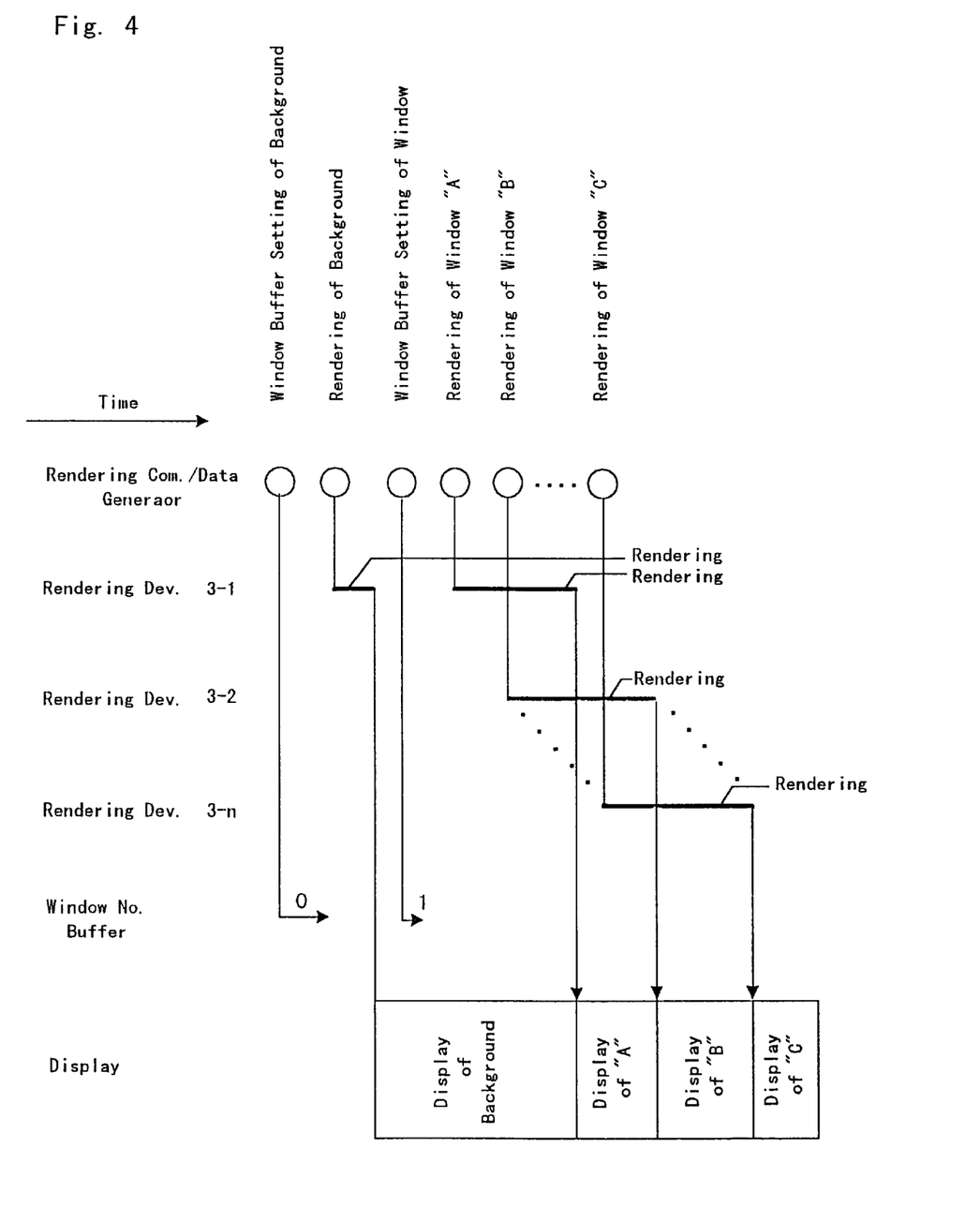
FIG. 4 is a time chart showing the operations of the embodiment of FIG. 1.

Referring now to FIG. 3 and FIG. 4, explanation is presented regarding the operation of this embodiment.

FIG. 3 shows an example in which one window is created and the display of this window is updated from "A" to "B" to "C". FIG. 4 is a time chart showing the operation of this embodiment.

First, the window number of the entire display screen of display 7, i.e., the background, is defined as "0", and the background is rendered as display screen 304. To this end, rendering command/data generator 1 fills in the entire surface (all areas (301)) of window number buffer 4 with window number "0". Rendering command/data generator 1 then issues to rendering device 3-1 rendering commands and data to fill in the entire screen of display 7 as is shown by reference number 304. After issuing fill-in rendering commands and data to rendering device 3-1, rendering command/data generator 1 supplies window number "0". This window number serves as information that indicates which window is to be rendered in accordance to the rendering command. The output of the window number to rendering device 3-1 normally waits until a permission signal is issued from the immediately preceding rendering device 3-n (the rendering device numbers have a circulating order such as: 1, 2, 3, . . . n–1, n, 1, 2, . . . ). However, issue of the window number to the rendering device to which the first rendering commands and data are issued for that window is performed immediately after that rendering device completes rendering. Rendering device 3-1 receives window number "0" issued by rendering command/data generator 1 after completion of background rendering and transmits this window number to window number/rendering device management table 6. The management table 6 thus sets the "device number of rendering device 3-1" in the field of the rendering device number for window number "0" (302).

After above-described process, window number "0" is supplied from window number buffer 4 to window number/ rendering device management table 6. In response to reception of window number "0" from window number buffer 4, the device number corresponding to (registered in combination with) the window number "0" is read out from management table 6. Management table 6 thus provides an output of the "device number of rendering device 3-1". In this way, screen 304 is displayed on the display screen of display 7.

Next, a window is created. In this embodiment, the window number of this window is defined as "1". Rendering command/data generator 1 first writes window number "1" in each area of window number buffer 4 that corresponds to the pixels within the window now to be rendered, as shown by reference number 305. (In FIG. 3, the section of window number buffer 4 denoted by "1" corresponds to the window of window number 1. The section is subdivided into small areas each corresponding to pixels of the window. Window number 1 is written in each of the small areas.)

After the above-described process is completed with respect to window number buffer 4, rendering command/ data generator 1 issues rendering commands and a one-screen of data for window 306 to rendering device 3-1. Rendering device 3-1 renders window 306 in its incorporated rendering memory by the rendering commands and data.

After issuing of the rendering commands and data of window 306 to first rendering device 3-1 is completed, rendering command/data generator 1 issues window number "1" of the rendered window to first rendering device 3-1. Thus, after rendering window 306, first rendering device 3-1 receives window number "1" from rendering command/data generator 1 and transmits this window number "1" to window number/rendering device management table 6. Window number/rendering device management table 6 thus sets the device number 3-1 (307) of rendering device 3-1 as a rendering device number for window number "1." The above-described processes enable to realize the display of this screen 322 of the window on display 7.

After issuing rendering commands and data to rendering device 3-1, rendering command/data generator 1 issues the rendering commands and a one-screen of data of window 308 to rendering device 3-2. Rendering device 3-2 renders window 308 in its incorporated rendering memory with the data in accordance with the rendering command. After issuing the rendering commands and data of window 308 to rendering device 3-2, rendering command/data generator 1 issues window number "1" of the window to be rendered.

Rendering device 3-2, after rendering window 308, receives window number "1" from rendering command/data generator 1, and transmits window number "1" to window number/rendering device management table 6. In this way, management table 6 updates the rendering device number for window number "1" from the device number (307) of rendering device 3-1 to the device number (309) of rendering device 3-2. The above-described processes enable window B of window number 1 to be displayed on display screen 310 of display 7.

Rendering command/data generator 1 subsequently repeats the above-described processes, whereby the device number (reference number 312) of rendering device 3-n is set as the rendering device number for window number "1" in window number/rendering device management table 6 at the time that rendering device 3-n completes processing.

Rendering device 3-n is connected to display 7 with this set value as a selection signal, and the brightness or color of the corresponding pixels of display 7 is controlled according to the content of the rendering memory of this rendering device 3-n. Window C is thus displayed in display screen 313 of display 7.

In this embodiment, each of rendering devices 3-1–3-n has a buffer of rendering commands and data, and can receive rendering commands or data even if rendering is not completed. As a result, rendering command/data generator 1 can sequentially issue rendering commands and data to the next rendering device during the above-described processes without confirming whether rendering has been completed in a rendering device or not.

FIG. 4 is a time chart of the above-described processes. In the example shown in this time chart, rendering command/data generator 1 completes issuing of rendering commands and data to a rendering device before the rendering device completes rendering, and the generator 1 begins issuing rendering commands and data to the next rendering device.

Figure 5:
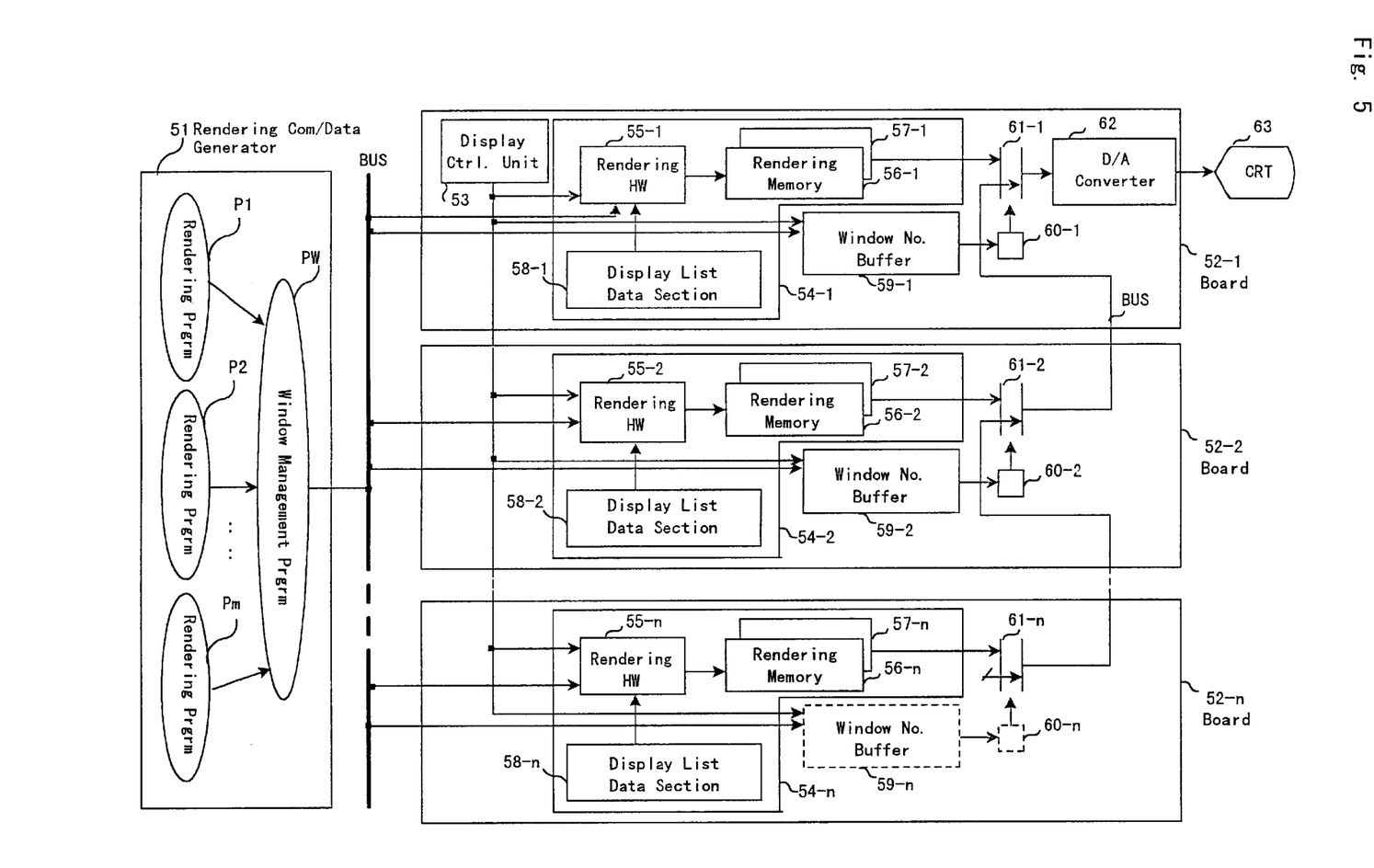
FIG. 5 is a block diagram of the second embodiment of the present invention.

Explanation is next presented regarding a second embodiment of the invention. FIG. 5 is a block diagram of another embodiment of the invention. The parallel rendering device of this embodiment is provided with rendering command/data generator 51, boards 52-1-52-n, CRT 63, and Buses.

Each of boards 52-k (k=1–n) is provided with: rendering device 54-k, window number buffer 59-k, window number/rendering device management table 60-k, and display switch 61-k. First board 52-1 is further provided with display control unit 53 and D/A converter 62.

Each rendering device 54-k is provided with: rendering hardware (rendering HW) 55-k, two rendering memories 56-k and 57-k, and display list data unit 58-k.

Rendering command/data generator 51 is realized by a plurality of render programs P1–Pm and window management program PW. Render programs P1–Pm are each in charge of the rendering of differing windows, and issue rendering commands and data necessary for rendering individual windows (including viewpoint information). Window management program PW has the function of sequentially distributing the rendering commands and data sequentially issued by render program Pi ($1 \leq i \leq m$) to each of rendering devices 54-1-54-n in a screen unit. Window management program PW further has the function of, after issue of the window rendering command and data to a rendering device 54-j ($1 \leq j \leq n$) is completed, issuing the window number of the window to be rendered pursuant to the command, to the relevant rendering device 54-j. Window management program PW, in addition, has the function of rewriting the content of window number buffers 59-1–59-n when the state of display of a window is changed, such as when a new window is displayed on the display screen of CRT 63, when the position of the window is changed, or when the window is closed.

Rendering hardware 55-1–55-n has the function of carrying out rendering in rendering memories 56-1–56-n and 57-1–57-n, based on rendering commands and data (including viewpoint information) supplied from rendering command/data generator 51, by performing affine transformation using data indicating a plurality of polygon shapes and colors that are stored in display list data units 58-1-58-n. Rendering is thus enabled in this embodiment by merely issuing a small number of parameters (viewpoint information) regarding affine transformation from rendering command/data generator 51. Thus, decreases in processing speed caused by data transfer can therefore be suppressed. This embodiment is therefore advantageous for high-speed three-dimensional graphics animation.

In addition, rendering hardware 55-1–55-n has the function of carrying out rendering by using one of the incorporated rendering memories (for example, 57-1–57-n) while reading from the other incorporated rendering memories 56-1–56-n. The provision of this function enables rendering without showing the user a screen while in the process of rendering and without allowing a rendering device to become empty. If this type of function were not provided, rendering without showing the user a screen in the process of rendering can be realized by waiting for rendering in the next rendering device to end, switching the next rendering device to the display, and then carrying out rendering of the display screen. A problem, however, then arises that rendering must be halted until display is switched over to the next rendering device. In this embodiment, however, rendering (writing display data into a rendering memory) is possible on the page opposite the display page (the virtual page corresponding to a rendering memory) even before display is switched to the next rendering device. The display data that are the content of the rendering memory, i.e., display data that has been written in the rendering memory, are displayed when the display switches to the content of this rendering memory.

Render hardware 55-1–55-n have the function of communicating the window number of the window for which rendering has been completed to all window number/ rendering device management tables 60-1–60-n when rendering has been completed.

Display control unit 53 has the same function as display control unit 2 shown in FIG. 1. Window number buffers 59-1-59-n and window number/rendering device management tables 60-1–60-n have the same configuration and function as window number buffer 4 and window number/rendering device management table 6, respectively, shown in FIG. 1. Each of display switches 61-1–61-n has the function of transferring the display data supplied from the rendering device of its own board to the display when the selection signal (the device number) transmitted from window number/rendering device management tables 60-1–60-n indicates the rendering device in its own board. Each of display switches 61-1–61-n has also the function of passing the display data supplied from the rendering device of other boards to the display when the selection signal indicates the rendering devices in other boards.

Explanation is next presented regarding the operation of this embodiment. As an example, explanation is presented for a case in which rendering program P1, which is charged with the rendering of window W1 of window number "1," and rendering program P2, which is charged with the rendering of window W2 of window number "2," alternately issue rendering commands and data of the first to $n^{th}$ screens. It is further presumed that information for the window of window number "0," which is the background, and windows W1 and W2 of window numbers "1" and "2" is already registered in window number buffers 59-1–59-n ("1" and "2" are set in the areas in each of window number buffers 59-1–59-n that correspond to the pixels in the display areas of windows W1 and W2, and "0" is set in the remaining areas).

When the rendering command and data of the first screen of window W1 are issued from rendering program P1, window management program PW supplies these rendering command and data to, for example, rendering device 54-1. Rendering device 54-1 accordingly carries out rendering of the first screen of window W1, and upon completion of the rendering process, issues window number "1" of window W1 to all window number/rendering device management tables 60-1–60-n. All window number/rendering device management tables 60-1–60-n thereby set up the device number associated with window number "1" to be the "device number of rendering device 54-1." By these operations, the output of window number/rendering device management table 60-1 for window number "1" becomes "device number of rendering device 54-1," and the rendering device 54-1 is selected such that the pixels of CRT 63 will display window W1. In this way, the display of the pixels within window W1 is performed in accordance with the display data supplied from rendering device 54-1.

When rendering commands and data for the first screen of window W2 are issued from rendering program P2, window management program PW supplies these rendering commands and data to, for example, rendering device 54-1. Rendering device 54-1 accordingly carries out rendering of the first screen of window W2, and upon completing the rendering process, issues window number "2" of window W2 to all window number/rendering device management tables 60-1–60-n. All window number/rendering device management tables 60-1–60-n thereby set up the device number associated with window number "2" to be the "device number of rendering device 54-1." By these operations, the output of window number/rendering device management table 60-1 for window number "2" becomes "device number of rendering device 54-1", and rendering device 54-1 is selected such that the pixels of CRT 63 will display window W2. In this way, the display of pixels within window W2 is performed in accordance with the display data that are supplied from rendering device 54-1.

When rendering commands and data for the second screen of window W1 are issued from rendering program P1, window management program PW supplies these rendering commands and data to second rendering device 54-2. Rendering device 54-2 accordingly carries out rendering of the second screen of window W1, and upon completing the rendering process, issues window number "1" of window W1 to all window number/rendering device management tables 60-1–60-n, whereby all window number/rendering device management tables 60-1–60-n change the device number associated with window number "1" to "device number of rendering device 54-2". By these operations, the output of window number/rendering device management table 60-1 for window number "1" becomes "device number of rendering device 54-2", and rendering device 54-2 is selected such that the pixels of CRT 63 will display window W1. In this way, the display of pixels within window W1 is realized in accordance with the display data that are supplied from rendering device 54-2.

When the rendering commands and data of the second screen of window W2 are issued from rendering program P2, window management program PW supplies these rendering commands and data to rendering device 54-2. Rendering device 54-2 accordingly carries out rendering of the second screen of window W2, and upon completing the rendering process, issues window number "2" of window W2 to all window number/rendering device management tables 60-1–60-n, whereby all window number/rendering device management tables 60-1–60-n change the device number associated with window number "2" to "device number of rendering device 54-2." By these operations, the output of window number/rendering device management table 60-1 for window number "2" becomes "device number of rendering device 54-2", and rendering device 54-2 is selected such that the pixels of CRT 63 will display window W2. In this way, the display of pixels within window W2 is realized in accordance with the display data supplied from rendering device 54-2.

An equivalent process is carried out by rendering devices 54-3–54-n each time rendering commands and data for the third to $n^{th}$ screens are issued from rendering programs P1 and P2.

The method of the present invention is effective for processing in which the areas of windows are all rewritten successively for each screen. However, since the rendering content of the rendering devices to be rendered is selected on a screen-to-screen base in the method of the present invention, problems may occur in the case of a rendering program having the characteristic of, for example, reading rendered content and processing the read content, or rendering by adding to an original screen. However, the method of this invention can be used without problems if rendering commands and data are issued to only one particular rendering device from a rendering program that is not compatible with the window management program of this invention, such as the above-described rendering program having the characteristic of rendering by adding to an original screen. In this case, however, only a specific rendering device is used and there will be no effect on improvement in rendering performance if considered in regard to only that particular rendering program, but an improvement in performance can be realized if the window management program of this invention processes together with other rendering programs that are compatible as a plurality of rendering programs in concert.

Explanation is next presented regarding the extendibility of the present invention. The embodiment of FIG. 5 is a system that was realized with extendibility in mind. First board 52-1 incorporates display control unit 53 for display and D/A converter 62 as an interface converter for supplying an image to CRT 63. The other boards do not require display control units or D/A converters. Control signals from display control unit 53 (for example, read addresses) are distributed from first board 52-1, provided with display control unit 53, to all other boards 52-2–52-n and control reading of display data from rendering memories 56-1–56-n and 57-1–57-n and reading of window numbers from window number buffers 59-1–59-n.

Display data pass through boards 52-3 and 52-2 in a series beginning from the board of a particular rendering device (for example, board 52-4), and are finally received in board 52-1, which has D/A converter 62. In this case, the display data are selected in each of boards 52-1–52-4. Window number buffers 59-1–59-4 and window number/rendering device management tables 60-1–60-4 function as the means for holding the information necessary for switching display data and must be incorporated into each of boards 52-1–52-4.

Explanation is here presented regarding transmission of display data from board 52-4 assuming that board 52-4 first (farthest upstream) provides an output of display data. Regarding the display data of board 52-4, board 52-4 serves only to supply the display data associated with the rendering device of board 52-4 to the next (downstream) rendering device, and no particular problems are raised in relation to the above-described construction regardless of what is sent to the next rendering device. Although, this board does not actually require window number buffer, a window number/rendering device management table, or a display switch, neither is there any particular need to alter the common construction which allows this rendering device to use the same board configuration as the other rendering devices.

Figure 6:
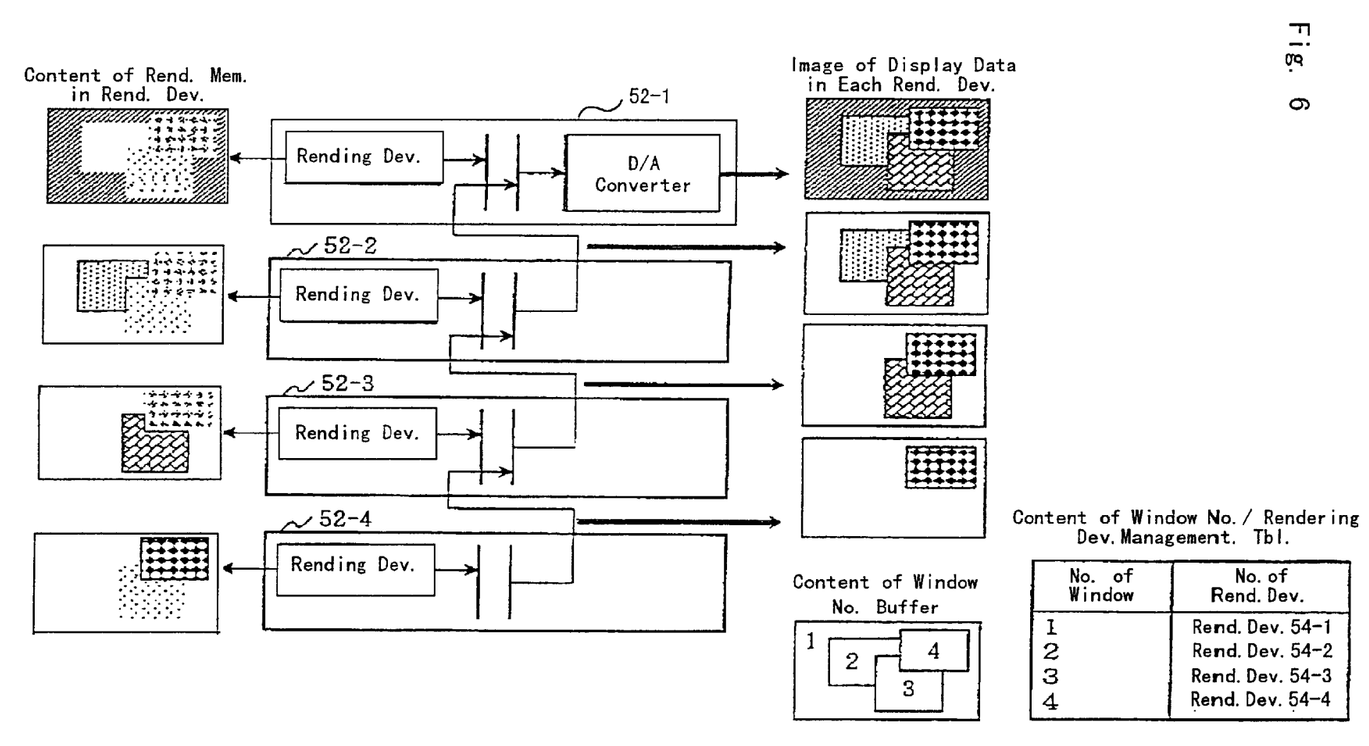
FIG. 6 is an explanatory view of the operations of the embodiment of FIG. 5.

The next board 52-3 serves to supply the display data of its own board [52-3] as well as to pass the display data received from a board that is upstream of the board 52-3. The same processing continues regarding display data sent from the subsequent (farther downstream) rendering devices, whereby the display data of the last board 52-1, which incorporates D/A converter 62, is configured such that the display data from each individual rendering device is synthesized corresponding to each section of the window number that is set in window number buffer 59-1. FIG. 6 shows a concrete example of this process.

As described in the foregoing explanations, the present invention sequentially distributes rendering commands and data to a plurality of rendering devices in units of the rendering commands and data necessary for making one screen display of one window, and performs parallel processing in screen and window units, thereby realizing an improvement in processing speed over the prior art that adopted pipeline processing or the prior art that performed parallel processing in units of rendering commands. This improvement is enabled because there are no slow stages that hold back other stages as in the art that adopted pipeline processing, and in addition, because it need not be judged whether or not the execution of rendering according to a rendering command is to be continued for each rendering command as in the art that adopted parallel processing in units of rendering commands.

In addition, because the present invention distributes processing by switching the display, the rendering devices that perform parallel processing are loosely coupled with each other, thereby allowing each of the rendering devices to have almost the same components. As a result, the system can be produced by designing just one rendering device and display synthesizing circuit, and this allows a reduction in design costs.

Finally, this invention allows the number of rendering devices to be simply and easily increased because the rendering devices can easily be arranged in parallel up to a number that can be represented by the bit width of the areas for storing device number provided in the window number/rendering device management tables. As a result, an improvement in processing speed can be achieved even if the processing speed of rendering devices themselves is not particularly fast, by simply increasing the number of rendering devices.

It is to be understood, however, that although the characteristics and advantages of the present invention have been set forth in the foregoing description, the disclosure is illustrative only, and changes may be made in the arrangement of the parts within the scope of the appended claims.

What is claimed is:

1. A parallel rendering device comprising:
    a plurality of rendering devices for generating display data in accordance with received rendering commands and data and storing the display data, each of said rendering device issuing a window number of the window that the rendering device is charged to render, upon completion of the generating and storing the display data;
    a rendering command/data generator for generating a rendering command and data and sequentially distributing the rendering command and data to each of said rendering devices with the rendering command and data for displaying one screen of a window as a unit;
    display switch means for connecting one of said rendering devices to a display to supply display data generated by said one of the rendering devices in response to a selection signal;
    a window number buffer for storing information indicating the position of the visible portion of each window to be displayed on the display;
    a window number/rendering device management table for registering the window number in combination with a corresponding rendering device number, said corresponding rendering device number being the device number of the rendering device that issued the window number of concern, said window number/rendering device management table, while receiving said information from said window number buffer, issuing, as said selection signal, rendering device number registered in combination with the window number of the window that has the visible portion indicated by said information; and
    means for controlling display, said means for controlling display controlling reading of said information stored in said window number buffer as well as reading of the display data from each of said plurality of rendering devices.

2. A parallel rendering device as claimed in claim 1, wherein said window number buffer has sections each corresponding to said visible portion of each window, each of said sections is subdivided into areas corresponding to pixels in said visible portion of the window in the screen of said display, and wherein each of said areas stores a window number of the window that includes the pixel corresponding to the area of concern so that the position of said visible portions of all windows are mapped on said window number buffer to represent said information.

3. A parallel rendering device as claimed in claim 2, wherein the rendering command/data generator allocates said window numbers to said window number buffer depending on a change in a state of display of a window.

4. A parallel rendering device as claimed in claim 3, wherein said rendering device has a function of issuing a permission signal by which the rendering device of concern permits a rendering device that is to perform rendering next to the rendering device of concern to start rendering, said permission signal being issued after the rendering device of concern issues the window number.

5. A parallel rendering device as claimed in claim 3, wherein said display is a raster scan display, and said means for controlling display reads said window number from said window number buffer to supply the window number to said window number/rendering device management table and also said means for controlling display reads the display data from the rendering device connected to the raster scan display by said display switch means, both in synchronization with vertical and horizontal synchronization signals.

6. A parallel rendering device comprising a plurality of boards, a rendering command/data generator for generating a rendering command and data and sequentially distributing the rendering command and data to each of said boards with the rendering command and data for displaying one screen of a window as a unit, and means for controlling display, each of said boards comprising:

a rendering device for generating display data in accordance with received rendering commands and data and storing the display data, each of said rendering device issuing a window number of the window that the rendering device is charged to render, upon completion of the generating and storing the display data;

window number buffer having sections each corresponding to visible portions of windows to be rendered by the rendering device of the board concerned as well as rendering devices of other boards, each of said sections being subdivided into areas that correspond to pixels included in said visible portion of the window in the screen of said display, wherein each of said areas stores a window number of the window that includes a pixel corresponding to the area of concern so that the positions of said visible portions of the windows to be rendered by said parallel rendering device are mapped on said window number buffer of each board;

a window number/rendering device management table for registering the window numbers in combination with corresponding rendering device numbers, said corresponding rendering device numbers being the device numbers of the rendering devices that issued the window number, said window number/rendering device management table, while receiving said window number from said window number buffer, issuing, as a selection signal, rendering device number registered in combination with the received window number;

display switch means for transferring, to a display, display data supplied from a rendering device of its own board as well as for passing the display data provided by rendering devices of the other boards, the display switch means being serially connected with display switch means of other boards by bus and selecting the transfer or the passage of the display data in response to the selection signal; and means for controlling display to control reading of said window number stored in said window number buffer as well as reading of the display data from each of said rendering devices in said plurality of boards, wherein said means for controlling display reads display data to supply to a pixel of a window and also reads the window number from an area of the window number buffer corresponding to the pixel.

7. A parallel rendering device according to claim 6, wherein the content of said window number/rendering device management table is updated each time when the rendering device charged with rendering of a window is changed.

8. A parallel rendering device according to claim 6, wherein said rendering command/data generator has a plurality of render programs and a window management program, said render programs being each charged with rendering of differing windows and issuing rendering commands and data necessary for rendering windows, and said window management program distributing the rendering commands and data sequentially issued by said render programs to each of rendering devices screen by screen, and each time when an issue of the rendering command and data to a rendering device is completed, issuing the window number of the window to be rendered, to the rendering device of concern, and wherein said window management program issues window numbers to be stored in said window number buffer and said means for controlling display controls writing of the window numbers to said window number buffer to allocate said window numbers in said window number buffer.

9. A parallel rendering device according to claim 6, wherein each of said rendering devices includes two rendering memories, and writes display data that were generated based on said rendering commands and data to one of the rendering memories while providing an output of the content of the other rendering memory.

10. A parallel rendering device according to claim 6 wherein each of said rendering devices is provided with a display list data unit for storing display list data that indicate a plurality of polygon shapes, and wherein each of said rendering devices generates display data based on rendering commands and data issued by said rendering command/data generator and also the contents of said display list data unit.

* * * * *